United States Patent
Gates et al.

(10) Patent No.: US 6,636,270 B2
(45) Date of Patent: Oct. 21, 2003

(54) CLOCK SLAVING METHODS AND ARRANGEMENTS

(75) Inventors: Matthijs A. Gates, Seattle, WA (US); Alok Chakrabarti, Bellevue, WA (US); William C. Powell, Seattle, WA (US)

(73) Assignee: Microsoft Corporation, Redmond, CA (US)

( * ) Notice: Subject to any disclaimer, the term of this patent is extended or adjusted under 35 U.S.C. 154(b) by 498 days.

(21) Appl. No.: 09/738,908

(22) Filed: Dec. 14, 2000

(65) Prior Publication Data

US 2002/0141451 A1 Oct. 3, 2002

(51) Int. Cl.[7] ............................................. H04N 9/475
(52) U.S. Cl. ..................... 348/512; 348/518; 370/516; 375/371
(58) Field of Search ................................. 348/500, 512, 348/536, 537, 423.1, 497, 425.4, 518, 419.1, 515; 370/514, 516, 509; 375/371, 355, 362; H04N 9/475

(56) References Cited

U.S. PATENT DOCUMENTS

| | | | | | |
|---|---|---|---|---|---|
| 5,771,075 A | * | 6/1998 | Rim et al. | ................... | 348/512 |
| 5,883,924 A | * | 3/1999 | Siu et al. | ..................... | 375/226 |
| 5,966,387 A | * | 10/1999 | Cloutier | ....................... | 370/516 |
| 6,021,168 A | * | 2/2000 | Huh | ............................. | 375/376 |
| 6,072,369 A | * | 6/2000 | Dhong et al. | .................. | 331/17 |
| 6,377,588 B1 | * | 4/2002 | Osaki | .......................... | 370/508 |

* cited by examiner

*Primary Examiner*—Michael H. Lee
(74) *Attorney, Agent, or Firm*—Lee & Hayes, PLLC

(57) ABSTRACT

In accordance with certain aspects of the present invention, an algorithm is provided that can be used to detect and track the difference between an on-host clock (i.e., "host clock") and a remote clock (i.e., "reference clock"). As part of the algorithm, a scaling value is computed and tracked over time. The scaling value, when applied to the host clock, results in clock values that increase at substantially the same rate as the reference clock itself increases. Hence, the host clock will have been slaved to the reference clock.

24 Claims, 5 Drawing Sheets

$$hc'_N = \begin{cases} hc'_{N-1} + (hc_N - hc_{N-1}) * m, & N > 0 \\ hc_0, & N = 0 \end{cases}$$

\* hc = host_clock

CLOCK SLAVING METHODS AND ARRANGEMENTS

TECHNICAL FIELD

This invention relates to digital communications, and more particularly to various methods and arrangements associated with a novel clock slaving algorithm.

BACKGROUND

Clock slaving is a process by which two clocks are significantly synchronized by having one of the clocks adjust to match the other clock. What makes clock slaving difficult, at times, is that there will always exist an inherent difference between the two clocks, even though they may be specified to run at the same rate. In other words, for all practical purposes, no two clocks are the same. The differences may be the result of manufacturing imperfections, material disparity, temperature, etc. For example, two ordinary wall clocks will never run exactly at the same rate, even though both are specified to increase at the same rate (60 seconds, 60 minutes, 24 hours, etc . . . ). Over time, they will first differ by seconds, then minutes, then hours, etc.

Timing is one of the critical issues confronting the digital media movement. Packetized digital information needs to be played back (processed and displayed) at specific intervals. If these intervals are even slightly off the viewers will probably notice.

Thus, careful attention is paid to timing. Take for instance the transmission of MPEG-2 video. Here, this digital media is ordinarily transmitted with presentation timestamps (PTS) that indicate when the data should be rendered. These timestamps are generated as values sampled from a reference clock that runs at a specified rate (27 MHz in the case of MPEG-2). When the data is broadcast to a remote client that does not have direct access to the reference clock used to generate the PTSs, a host clock (at the receiving client) must be used as reference to determine when a PTS becomes valid, i.e. is now. However, because these are two different clocks, a disparity will exist and grow over time between the PTS and the host clock samples they are compared against. An eventual buffer overflow/underflow will occur as the PTSs values change at a subtly different but diverging rate from the host clock.

Because of this problem, MPEG-2 systems streams contain reference clock values known as Program Clock Reference (PCR), which are transmitted at regular intervals. A remote client receives those sampled values and is able to determine the drift that exists between its clock (host clock) and the reference clock, and make small adjustments to match it exactly. This process is one form of "clock slaving" that, in the past, has been provided via a phase locked loop (PLL) circuit, whereby a Voltage Controlled Oscillator (VCO) is adjusted to output a 27 MHz signal that is slaved to the reference clock. In this case the VCO acts as the host clock.

One of the problems with this solution is that each separate data stream will require access to a PLL. Thus, if two or more streams are to be watched simultaneously, then two or more PLL arrangements are required.

Moreover, as personal computers are increasingly used in the broadcast realm, they will encounter this problem. It is not usually feasible to have a VCO that is readily accessible by a user-mode process, and thus an alternative solution must exist.

Furthermore, because a PC is a versatile platform, there can be more than one process at a single time being used for broadcast, in which case each would need to slave to its own broadcast's reference clock. Again, were they all to use the usual PLL arrangement, an equal number of on-host VCOs would need to be available.

Consequently, there is a need for improved methods and arrangements that can be used to provide the requisite clock slaving without requiring extensive and potentially costly hardware. Preferably, the methods and arrangements will be suitable for use with any type of digital signal/media and adaptable to a variety of devices and systems.

SUMMARY

In accordance with certain aspects of the present invention, an algorithm is provided that can be used to detect and track the difference between an on-host clock (subsequently referred to as "host clock") and a remote clock (subsequently referred to as "reference clock"). As part of the algorithm, a scaling value is is computed and tracked over time. The scaling value, when applied to the host clock, results in clock values that increase at substantially the same rate as the reference clock itself increases. Hence, the host clock will have been slaved to the reference clock.

The exemplary algorithm described herein does not rely as heavily on hardware as previous solutions (i.e., PLL solutions, etc.). Instead a high-resolution host clock is sampled and the disparity between it and the reference clock is tracked. The disparity results in the scaling value. When a host-clock delta value is multiplied by the scaling value to obtain a scaled delta value, the scaled delta value will equal to the reference clock delta value. As such, over time, the scaled delta value will change at a rate that is substantially equal, and thus slaved, to the reference clock delta.

The algorithm described herein can be used to slave a host clock to any reference clock in any broadcast scenario. While the solution is presented using an MPEG-2 specific solution, the core algorithm is itself generic in nature. Thus it provides a way to slave that is generic to any broadcast situation in which clock-slaving must happen.

This algorithm is particularly useful to computers and other like devices because all processes can use the same multimedia timer, but each will generate a different scaling value to generate a host clock that effectively slaves it to its corresponding reference clock.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
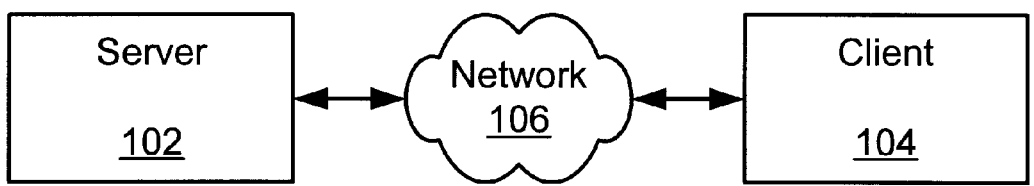
FIG. 1 is a block diagram depicting an exemplary networked client-server arrangement, in accordance with certain aspects of the present invention.

FIG. 1 is a block diagram generally depicting an arrangement 100 having a digital media transmitter node (server) 102 operatively coupled to provide at least one digital media stream to a receiving node (client) 104 through one or more communication resources (network) 106. Here, network 106 may include any number of radio-wave transceivers, receivers, transmitter, satellites, cables, fibers, wires, waveguides, etc., suitable for carrying a digital media data stream between server 102 and client 104.

Server 102 can include one or more computers and other related broadcast devices. Client 104 can include a special purpose computer or like device/appliance and/or a general-purpose computer that is configured to receive and process the data stream, accordingly. In certain exemplary implementations below, a high definition television (HDTV) appliance is described as having been programmed with the clock slaving algorithm described herein.

Figure 2:
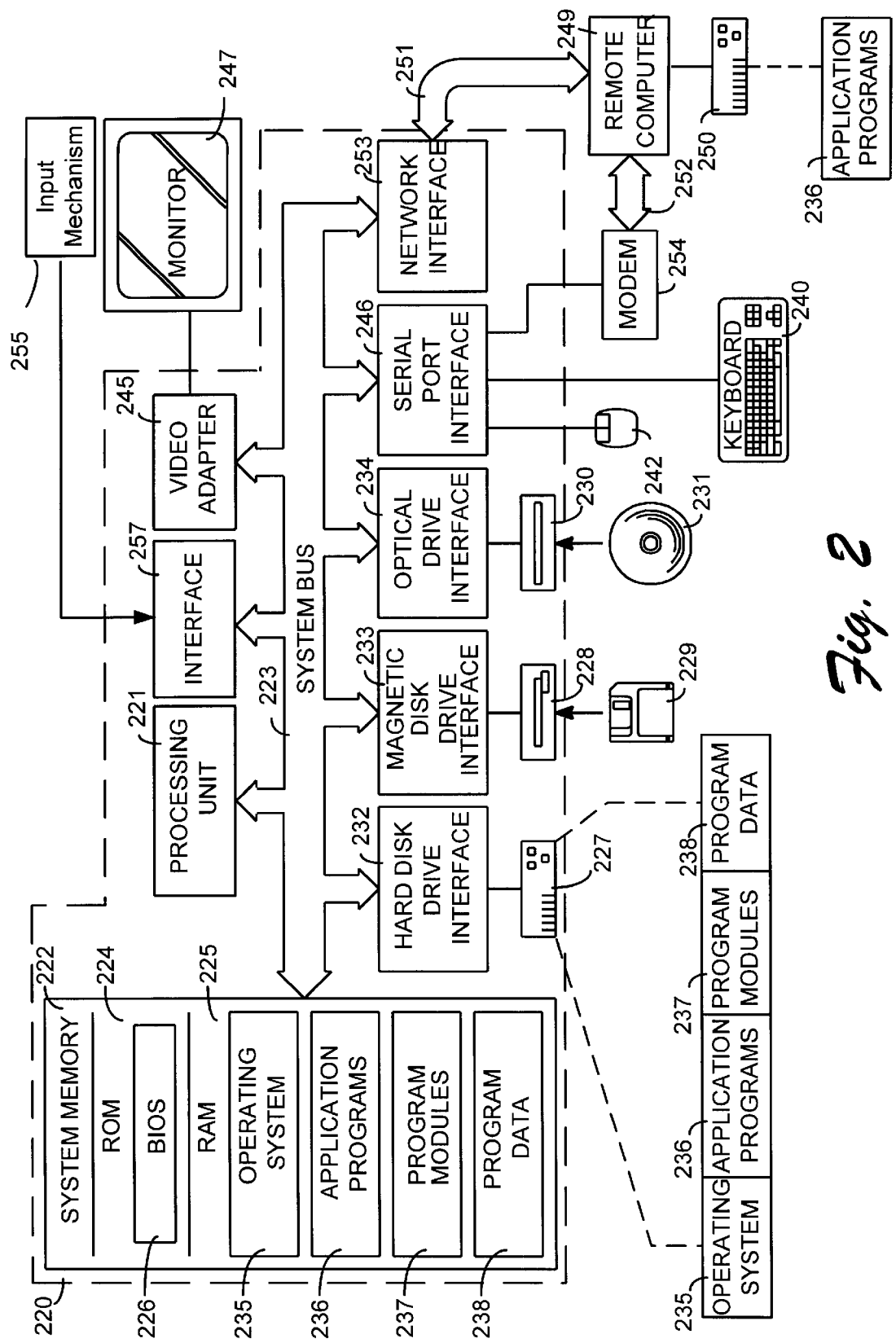
FIG. 2 is a block diagram illustrating an exemplary computing environment, suitable for use with the arrangement in FIG. 1.

With this in mind, attention is now drawn to FIG. 2, which is a block diagram depicting an exemplary computing system 200 suitable with arrangement 100.

Computing system 200 is, in this example, in the form of a personal computer (PC), however, in other examples computing system may take the form of a dedicated server(s), a special-purpose device, an appliance, a handheld computing device, a mobile telephone device, a pager device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). A camera/microphone 255 or other like media device capable of capturing or otherwise outputting real-time data 256 can also be included as an input device to computing system 200. The real-time data 256 can be input into computing system 200 via an appropriate interface 257. Interface 257 can be connected to the system bus 223, thereby allowing real-time data 256 to be stored in RAM 225, or one of the other data storage devices, or otherwise processed.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

The next few sections provide details into the basic functional subsystems of a server and client with respect to the handling of a media data stream.

Figure 3:
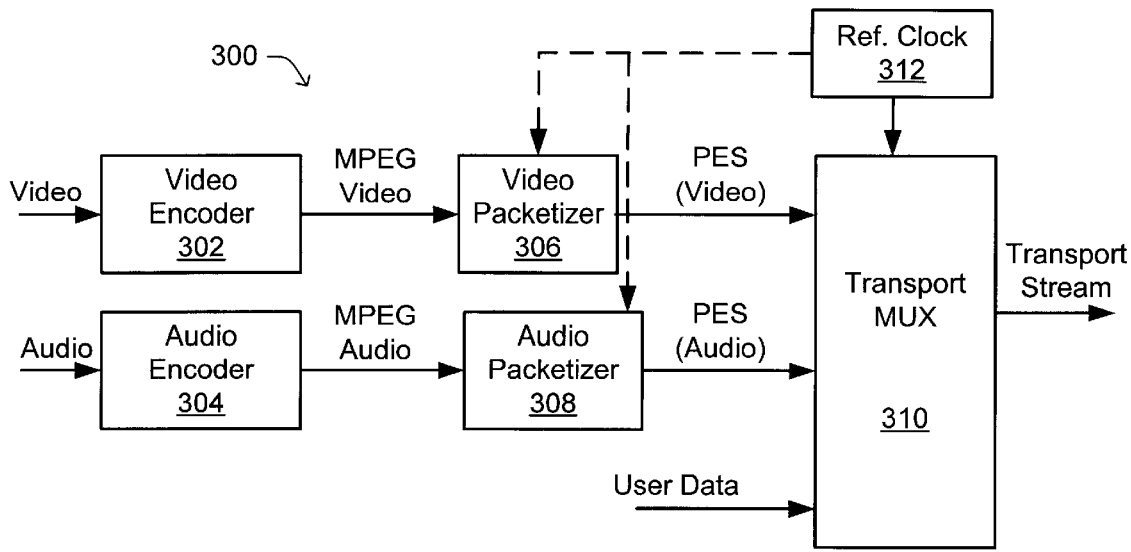
FIG. 3 is a block diagram depicting an exemplary server node suitable for use with the arrangement in FIG. 1.

FIG. 3 is a block diagram depicting an exemplary portion 300 of a server configured to output a transport stream. Portion 300 includes a video encoder 302 and an audio encoder 304 configured to receive video and audio signals, and output corresponding MPEG video and MPEG audio, respectively. A video packetizer 306 is operatively coupled to the output of video encoder 302 and configured to output a packetized elementary stream (PES) corresponding to the encoded video. Likewise, an audio packetizer 308 is operatively coupled to the output of audio encoder 304 and configured to output a PES corresponding to the encoded audio. Video packetizer 306 and audio packetizer 308 are further operatively coupled to receive a clock signal from a reference clock 312 and in response to insert presentation timing information into the outgoing PES. The outgoing PES along with other data, such as, e.g., user data, is provided to a transport multiplexer (MUX) 310, which multiplexes the inputs to produce a corresponding transport stream.

Figure 4:
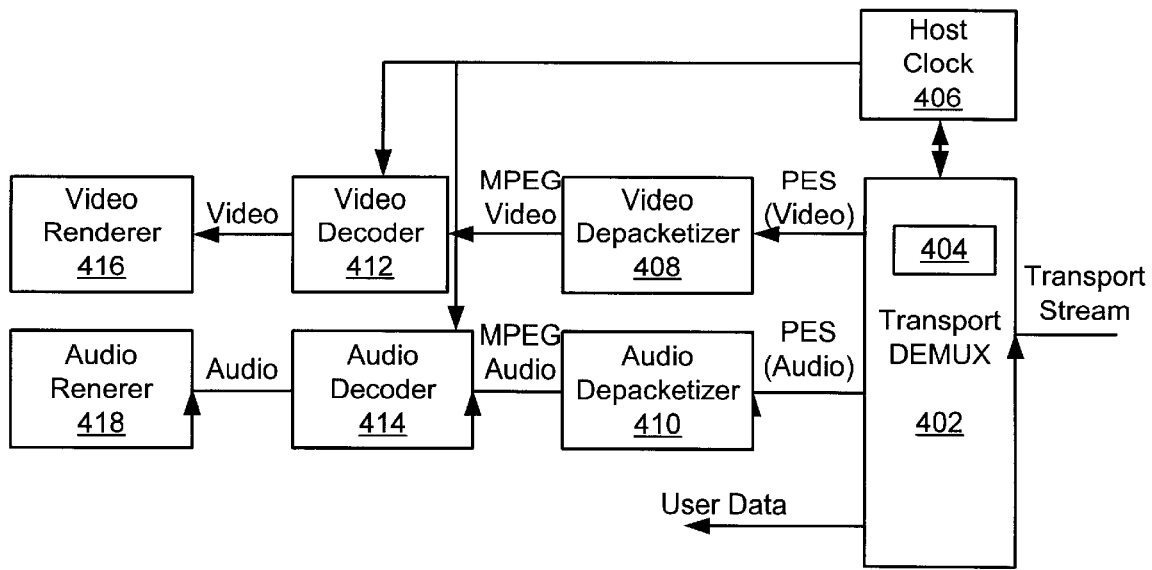
FIG. 4 is a block diagram depicting an exemplary client node suitable for use with the arrangement in FIG. 1.

FIG. 4 is a block diagram depicting an exemplary portion 400 of a client configured to receive the transport stream. Portion 400 includes a transport demultiplexer (DEMUX) 402, which receives the transport stream and demulitplexes it to produce a PES (video), PES (audio) and user data (optional) data streams.

Clock slaving logic 404 is provided within DEMUX, 402 in accordance with certain aspects of the present invention, and configured to modify a host clock 406 operatively coupled to DEMUX 402 based on the PCRs received with the transport stream.

The PES (video) data stream is provided to a video depacketizer 408, which, as its name suggests, depacketizes the PES (video) data stream and outputs corresponding MPEG video data. Similarly, the PES (audio) data stream is is provided to an audio depacketizer 410 that depacketizes the PES (audio) data stream and outputs corresponding MPEG audio data.

The resulting MPEG video data is provided to a video decoder 412 that is configured to decode the MPEG video data and output corresponding video data to a video renderer 416. Video decoder 412 does so using timing information provided by host clock 406.

The resulting MPEG audio data is provided to an audio decoder 414 that is configured to decode the MPEG audio data and output corresponding audio data to an audio renderer 418. Audio decoder 414 also does this by using timing information provided by host clock 406.

Video renderer 416 generates a display based on the video data and audio renderer 418 reproduces audio based on the audio data.

Those skilled in the art will recognize that data can be buffered at various stages in either of portions 300 or 400, as needed, and that such detail is beyond the scope of this description.

The next section provides additional details on a clock slaving algorithm that can be implemented, for example, in logic 404 of FIG. 4, or other like devices/configurations. In one example below, the clock slaving algorithm is configured for use with Direct Show (DShow), and in another with an HDTV appliance.

In the example below, the code was written for use in HDTV demultiplexing software. For this particular component, the client-side rendering software has to make use of a clock that is slaved to the reference clock. The demultiplexer exposes such a clock when configured with logic 404.

HDTV programs are authored remotely, using a common (physically) reference clock. The programs are then broadcast to clients. Each client must slave its host clock to the reference clock. To date, HDTV solutions are monolithic. A large application is tightly coupled with hardware. The application, with hardware assist, demultiplexes, decodes, and renders. A hardware-based VCO clock is used and is readily accessible from all parts of the application. Such a solution is monolithic and fixed, and yields no room for change or improvement.

The solution presented herein is non-monolithic. No specific hardware requirements must exist, other than the presence of one high-performance timer. Any number of broadcast applications can then use the timer as a basis from which to slave their host clocks. It can be used for any PC-based system, and as such must, and is, sufficiently versatile to work on non-monolithic platforms. Furthermore, the algorithm is scalable, and not bound to HDTV's 27 MHz system clock.

If such a slaving scheme were not in place, a buffer underflow or overflow situation would arise. A buffer overflow exists when the incoming stream rate exceeds the actual throughput of the receive-to-render rate, and all buffer space is used. When all extra buffering becomes exhausted, data will be lost at the receiver because no buffer will be available to receive into. Buffer overflow would occur if the host clock ran slightly slower than the reference clock. The manifestation of this problem would be lost data. A buffer underflow occurs when the actual throughput of receive-to-render rate is faster than the delivery rate. In this case, no buffering will exist, and all data will be rendered as rapidly as possible. The manifestation of this problem is non-smooth playback.

In certain implementations, the clock slaving algorithm can be considered a disparity detection algorithm. In the commented code example below, an initial value selection process is shown. This also outlines how host clock 406 values should be computed and initialized, based on the multimedia timer and the detected clock drift (e.g., using PCR timing information).

Algorithm Terms

PCR Program Clock Reference; a timestamp in an MPEG-2 transport stream from which decoder/rendering timing information is derived; variables named "PCR" have values derived from the transport stream timestamps.

QPC QueryPerformanceCounter; an API call to sample a high-resolution multimedia timer; variables named with "QPC" have values derived from the multimedia timer.

Media Sample DirectShow data structure used to reference data; data is usually of multimedia content, but not restricted to this.

UNDEFINED constant used to initialize variables and indicate that they are undefined Basic Algorithm Defined for Dshow Implementation DEMUX 402/Logic 404 exposes a clock that is slaved to a PCR stream. The PCR is a sampled value from reference clock 312, which is also used to generate the PES PTS. Since DEMUX 402/Logic 404 produces DShow presentation timestamps, which are scaled-only values of the PES PTS values, keeping a graph clock in sync with the headend clock ensures that buffers will never underflow/overflow. DEMUX 402/Logic 404 therefore slaves to the PCRs by sampling the QPC counter every time a PCR is received. Over time, a delta which is relatively free of on-host jitter such as batched media sample deliveries, interrupts between buffer reception and buffer processing, etc . . . , is built up for each clock. The slope PCR(delta)/QPC(delta) would be 1.0 if they are identical. Most likely, they are not, in which case the slope provides a direct scaling value to skew the QPC clock values to the PCR clock.

To return a time, logic 404 keeps track of the following:

1. QPC when it was last called—QPC_last

2. QPC derived time it last returned—QPC_last_derived

Logic 404 then does as follows 1. samples the QPC clock to get QPC_now

2. QPC_delta=QPC_now—QPC_last

3. QPC_now_derived=QPC_last_derived+PCR_QPCSlopeUsed * QPC_delta

Where, PCR_QPCSlopeUsed is obtained as described in the algorithm below:

PCR slaving algorithm:

```
    Receive (PCR, Discontinuity)
    {
        // sample - on-host clock
        QPC_now = QueryPerformanceCounter ()
        // normalize the QPC value
        QPC_now_normalized = QPC_now - QPC_first
        // normalize the PCR value
        PCR_normalized = Normalize (PCR)
        if (Discontinuity == FALSE) {
            if (PCR_last != UNDEFINED) {
                PCR_total += PCR_normalized - PCR_last
                QPC_total += QPC_now_normalized - QPC_last
            }
            if (PCR_last != UNDEFINED AND
                PCR_total > 0           AND
                QPC_total > 0) {
                PCR_QPCSlopeNew = PCR_total / QPC_total
                if (PCR_QPCSlopeNew > PCR_QPCSlopeUsed + AllowableError) {
                    // above allowable bounds;
                    // ADJUST up
                    Diff = PCR_QPCSlopeNew - PCR_QPCSlopeUsed
                    SlopeStep = MIN (Diff, MaxSlopeStepValue)
                    PCR_QPCSlopeUsed = PCR_QPCSlopeUsed + SlopeStep ;
                    // allowable error is initialized to a smaller and smaller
                    // value as it converges
                    AllowableError = MIN (MaxAllowableErrorBracket, Diff)
                }
                else if (PCR_QPCSlopeNew < PCR_QPCSlopeUsed - AllowableError) {
                    // below allowable bounds;
                    // ADJUST down
                    Diff = PCR_QPCSlopeused - PCR_QPCSlopeNew
                    SlopeStep = MIN (Diff, MaxSlopeStepValue)
                    PCR_QPCSlopeUsed = PCR_QPCSlopeUsed - SlopeStep
                    // allowable error is initialized to a smaller and smaller
                    // value as it converges
                    AllowableError = MIN (MaxAllowableErrorBracket, Diff)
                }
                else {
                    // within allowable bounds
                    // DEGRADE AllowableError
                    AllowableError -= ErrorBracketDegradation
                }
            }
            PCR_last = PCR_normalized ;
            QPC_last = QPC_now_normalized ;
        }
    }
    Initial values are set as follows:
        // logic 404 immediately start correcting
            AllowableError          = 0 ;
        // macro defined below
            MaxSlopeStepValue       = MAX_SLOPE_STEP_VALUE () ;
        // expect perfect
            PCR_QPCSlopeUsed        = 1 ;
        // macro defined below
            ErrorBracketDegradation=ERROR_BRACKET_DEGRADATION () ;
        // macro defined below
            MaxAllowableErrorBracket=MAX_ALLOWABLE_ERROR_BRACKET () ;
    Timing constants for HDTV example:
// H.222.0, D.0.2 "Audio and video Presentation Synchronization", pp. 95
#define MAX_INTRA_PTS_INTERVAL_MILLIS      700
// H.222.0, D.0.3 "System Time Clock recovery in the decoder", pp. 96
#define MAX_INTRA_PCR_INTERVAL_MILLIS      100
#define MAX_PCR_RATE
(MILLISECONDS_PER_SECOND / MAX_INTRA_PCR_INTERVAL_MILLIS)
//
// H.222.0, 2.4.2.1 places the following restraint on rate of change of the
// system clock :
//
//      rate of change of system_clock_frequency <= 75 x 10^-3 Hz/s
//
// since we use QPCs to expose a clock (that in turn is slaved to PCRs), the
// above constraint must be enforced against the QPC frequency on the local
```

-continued

```
// host, over time
//
// our slaving schema is to compute a scaling value (slope) over time, which
// we multiply against a QPC value to skew the value appropriately (greater,
// or less, depending on the PCR-QPC relationship)
//
// thus, given QPC(f) as being the QPC frequency (Hz/s) on the local host,
// and N(i) being a current "skewing" value that changes over time as we
// slave to the PCRs, our maximum allowable rate of change is computed as
// follows [QPC(f) changes from host to host, but is assumed constant on
// a single host]:
//
//        [i : seconds]
//
//        abs (N(i) * QPC(f) - N(i+1) * QPC(f)) <= 0.075
// or
//        abs (N(i) - N(i+1)) * QPC(f) <= 0.075
// or
//        abs (N(i) - N(i+1)) <= 0.075 / QPC(f)
//
// we can then use the above formula, coupled with the maximum rate of
// arrival of PCRs, to compute a maximum "clock step" with which to
// correct our scaling value:
//
//        [k : PCRs]
//
//        PCR_rate = MILLISECONDS_PER_SECOND / MAX_INTRA_PCR_INTERVAL_MILLIS
//
//        abs (N(k) - N(k+1)) <= (0.075 / QPC(f)) / PCR_rate
// or
//        abs (N(k) - N(k+1)) <= 0.075 / (QPC(f) * PCR_rate)
//
// macro yields a double value that is the maximum rate change, from
// pcr to pcr; mult is a registry supplied value that defaults to 1,
// but can be increased to increase the rate of closure between what we
// are observing and what we are using to slave
#define MAX_SLOPE_STEP_VALUE(qpc_freq,mult) \
    ((double) (((0.075) * (double) (mult)) / (double (qpc_freq) * double (MAX_PCR_RATE))))
// this is a multiplier that is used in the allowable error bracket, which
// is a multiplier, within which we allow the clock to "jitter" i.e. drift
// up and down without triggering a correction
#define ACCEPTABLE_CLOCK_JITTER_MULTIPLIER       10.0
// macro yields the max correction threshold frame size;
#define MAX_ALLOWABLE_ERROR_BRACKET(max_clock_step) \
    ((max_clock_step) * ACCEPTABLE_CLOCK_JITTER_MULTIPLIER)
// macro yields the correction frame size degradation; current frame
// size degrades when no corrections are made;
#define ERROR_BRACKET_GRANULARITY                1000.0
#define ERROR_BRACKET_DEGRADATION(max_clock_step) \
        (MAX_ALLOWABLE_ERROR_BRACKET(max_clock_step)   /
ERROR_BRACKET_GRANULARITY).
```

Figure 5:
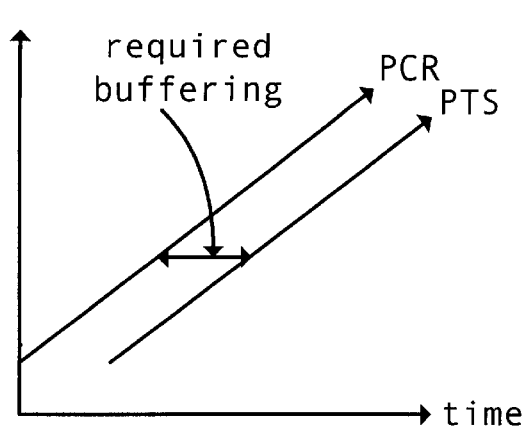
FIGS. 5–8 are graphs depicting buffering requirements associated with clock drifting.
Figure 6:
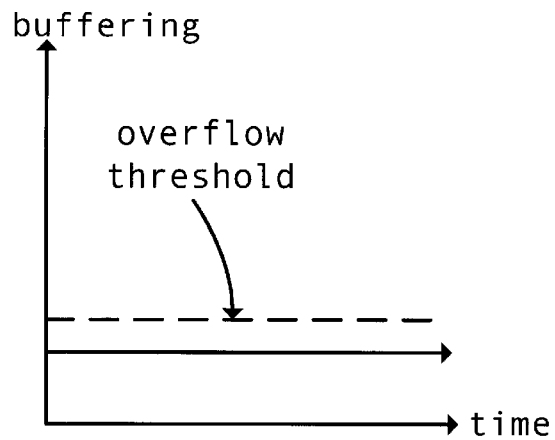
Figure 7:
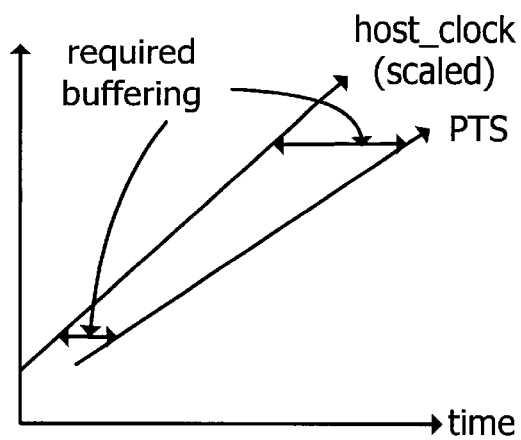
Figure 8:
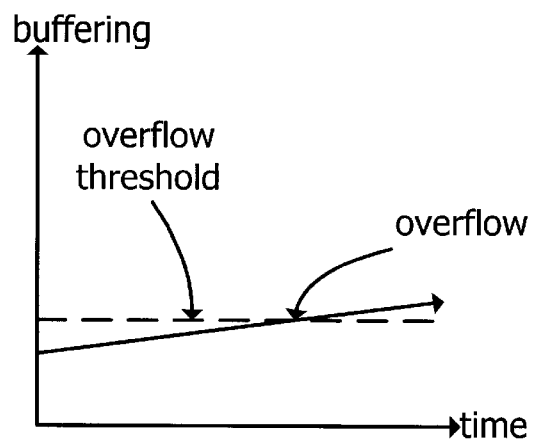

With these examples in mind, reference is now made to FIGS. 5–8, which are graphs depicting the amount of buffering required over a period of time. FIGS. 5 and 6 illustrate the head-end clock relationship, wherein PCRs and PTSs are being sampled from the same block, so no drift occurs. FIGS. 7 and 8 illustrate the presence of clock-drift and the buffering problem it introduces.

Figure 9:
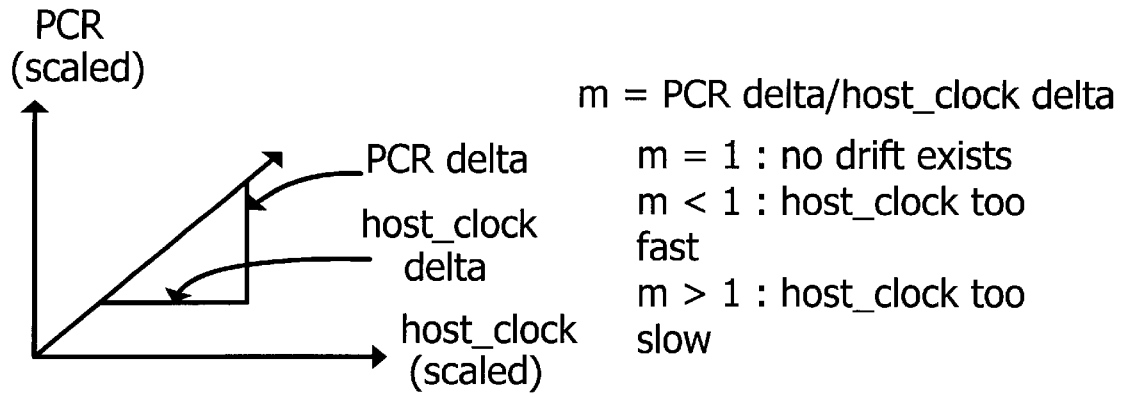
FIG. 9 is a graph depicting a slope determined as a function of a local time and timestamp.
Figure 10:
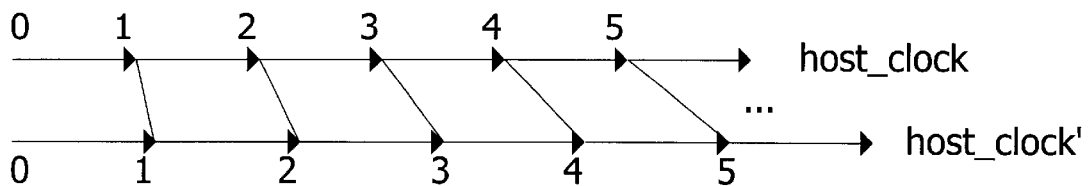
FIG. 10 is a timeline chart depicting the clock slaving of a client node to a server node.

The graph in FIG. 9 and accompanying text demonstrates the slope to drift relationship. The diagram in FIG. 10 shows the host_clock timeline and how the graph clock values are computed based on the slope (m), and the last returned time (host_clock$_{N-1}$).

The various methods and arrangements described herein also ensure that PTS values and host clock values always increase monotonically over time. Usually, over time, as streams that have been authored in different places are broadcast, the PTS/PCR sample values will present discontinuous values when a program is switched. For example, when a switch is made from normal programming to a commercial, such a discontinuity can be observed. When normal programming is resumed after the commercial, another discontinuity can be observed. There can also be discontinuities commercial-commercial. The clock slaving algorithm smoothes out these discontinuities and expose a host clock and generate presentation time stamps that always increase monotonically.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for slaving a clock to a data stream having reference clock value timestamps, the method comprising:
    sampling a local timer to get a current time;
    determining a difference between the current time and a previously sampled current time; and
    deriving a new time based on a last new derived time, a scaling value, and the difference between the current time and a previous current time.

2. The method as recited in claim 1, wherein the scaling value includes a slope value that is equal to a host clock delta divided by a reference clock value timestamp delta.

3. The method as recited in claim 2, wherein if the slope value is less than 1.0, then the host clock is selectively slowed down to better match a clock associated with the reference clock value timestamp.

4. The method as recited in claim 2, wherein if the slope value is greater than 1.0, then the host clock is selectively sped up to better match a clock associated with the reference clock value timestamp.

5. The method as recited in claim 2, wherein if the slope value is significantly equal to 1.0, then the host clock significantly matches a clock associated with the reference clock value timestamp.

6. The method as recited in claim 1, wherein the reference clock value timestamp is a PCR timestamp.

7. The method as recited in claim 1, wherein the local timer is a multimedia timer.

8. The method as recited in claim 1, further comprising outputting the derived current time to a decoder.

9. A computer-readable medium having computer-executable instructions for slaving a clock to a data stream having reference clock value timestamps, the computer-executable instructions for performing steps comprising:

sampling a local timer to get a current time;

determining a difference between the current time and a previously sampled current time; and deriving a new time based on a last new derived time, a scaling value, and the difference between the current time and a previous current time.

10. The computer-readable medium as recited in claim 9, wherein the scaling value includes a slope value that is equal to a host clock delta divided by a reference clock value timestamp delta.

11. The computer-readable medium as recited in claim 10, wherein if the slope value is less than 1.0, then the host clock is selectively slowed down to better match a clock associated with the reference clock value timestamp.

12. The computer-readable medium as recited in claim 10, wherein if the slope value is greater than 1.0, then the host clock is selectively sped up to better match a clock associated with the reference clock value timestamp.

13. The computer-readable medium as recited in claim 10, wherein if the slope value is significantly equal to 1.0, then the host clock significantly matches a clock associated with the reference clock value timestamp.

14. The computer-readable medium as recited in claim 9, wherein the reference clock value timestamp is a PCR timestamp.

15. The computer-readable medium as recited in claim 9, wherein the local timer is a multimedia timer.

16. The computer-readable medium as recited in claim 9, further comprising computer-executable instructions for outputting the derived current time to a decoder.

17. An apparatus for slaving a clock signal to a data stream having reference clock value timestamps, the apparatus comprising:

a local timer; and logic configured to:

sample the local timer to get a current time, determine a difference between the current time and a previously sampled current time, and derive a new time based on a last new derived time, a scaling value, and the difference between the current time and a previous current time.

18. The apparatus as recited in claim 17, wherein the scaling value includes a slope value that is equal to a host clock delta divided by a reference clock value timestamp delta.

19. The apparatus as recited in claim 18, wherein if the slope value is less than 1.0, then the host clock is selectively slowed down to better match a clock associated with the reference clock value timestamp.

20. The apparatus as recited in claim 18, wherein if the slope value is greater than 1.0, then the host clock is selectively sped up to better match a clock associated with the reference clock value timestamp.

21. The apparatus as recited in claim 18, wherein if the slope value is significantly equal to 1.0, then the host clock significantly matches a clock associated with the reference clock value timestamp.

22. The apparatus as recited in claim 17, wherein the reference clock value timestamp is a PCR timestamp.

23. The apparatus as recited in claim 17, wherein the local timer is a multimedia timer.

24. The apparatus as recited in claim 17, further comprising a decoder operatively coupled to the logic and configured to receive the derived new time.

* * * * *